US011951636B1

United States Patent
Vaziri et al.

(10) Patent No.: US 11,951,636 B1
(45) Date of Patent: Apr. 9, 2024

(54) METHODS OF COLLECTING DATA THROUGH TEST INTERACTIONS

(71) Applicant: Embodied Intelligence Inc., Berkeley, CA (US)

(72) Inventors: Andrew Vaziri, Berkeley, CA (US); Mostafa Rohaninejad, Berkeley, CA (US)

(73) Assignee: Embodied Intelligence Inc., Berkeley, CA (US)

( * ) Notice: Subject to any disclaimer, the term of this patent is extended or adjusted under 35 U.S.C. 154(b) by 242 days.

(21) Appl. No.: 17/161,419

(22) Filed: Jan. 28, 2021

Related U.S. Application Data (60) Provisional application No. 62/966,820, filed on Jan. 28, 2020.

(51) Int. Cl.
*B25J 9/16* (2006.01)

(52) U.S. Cl.
CPC ............. *B25J 9/1692* (2013.01); *B25J 9/163* (2013.01); *B25J 9/1669* (2013.01); *B25J 9/1671* (2013.01); *B25J 9/1697* (2013.01)

(58) Field of Classification Search
CPC ...... B25J 9/1612; B25J 9/1669; B25J 9/1692; B25J 9/1697; B25J 9/1671; B25J 9/163; B25J 9/1633; B25J 9/1664; B25J 9/1605; G05B 2219/40386; G05B 2219/45063; G05B 2219/40053
See application file for complete search history.

(56) References Cited

U.S. PATENT DOCUMENTS

| | | | |
|---|---|---|---|
| 7,313,464 B1 | 12/2007 | Perreault et al. | |
| 9,393,693 B1 * | 7/2016 | Kalakrishnan | B25J 9/1633 |
| 9,975,242 B1 | 5/2018 | Stubbs et al. | |
| 2008/0082213 A1 * | 4/2008 | Ban | B25J 9/1697 |
| | | | 901/50 |
| 2012/0165986 A1 * | 6/2012 | Fuhlbrigge | B25J 9/1687 |
| | | | 382/153 |
| 2014/0316572 A1 * | 10/2014 | Iwatake | B25J 9/1612 |
| | | | 700/258 |
| 2019/0160678 A1 * | 5/2019 | Zhang | B25J 9/1664 |
| 2019/0361672 A1 * | 11/2019 | Odhner | G06F 7/00 |
| 2020/0130963 A1 * | 4/2020 | Diankov | G06T 19/20 |

* cited by examiner

*Primary Examiner* — Khoi H Tran
*Assistant Examiner* — Tanner L Cullen (57) ABSTRACT

Various embodiments of the technology described herein generally relate to robotic systems for interacting with objects in a warehouse environment. More specifically, certain embodiments relate to systems and methods for collecting data related to robotic picking of objects through test interactions. In some embodiments, a robotic device may work in collaboration with a computer vision system for collecting data related to new objects in a warehouse, commercial, industrial, or similar environment. A robotic picking system may operate in a data collection mode during which objects are sent to a robotic picking device for data collection during one or more test interactions or test stimuli. The test interactions and stimuli may be used to produce a whitelist of objects that the robotic picking device may attempt to pick up during regular operation.

20 Claims, 7 Drawing Sheets

METHODS OF COLLECTING DATA THROUGH TEST INTERACTIONS

CROSS-REFERENCE TO RELATED APPLICATIONS

This application is related to and claims priority to U.S. Provisional Patent Application No. 62/966,820, entitled "METHODS OF COLLECTING DATA THROUGH TEST INTERACTIONS," filed on Jan. 28, 2020, which is incorporated by reference herein in its entirety.

BACKGROUND

Robotic devices may serve many purposes in industrial and warehouse environments. Robots are often used to perform laborious, repetitive tasks, with or without human supervision. However, the capabilities of a robotic device are often limited by their lack of ability to perceive the environment and make decisions based on perceptions. Machines programmed solely to repeat a task or action encounter issues or frequently get stuck, often requiring human intervention too frequently to actually increase productivity or efficiently. Computer vision systems enable machines to sense or perceive the environment around them and machine learning techniques may enable robotic devices to apply that knowledge to future decisions.

Computer vision techniques enable a system to gain insight into its environment based on digital images, videos, scans, and similar visual mechanisms. High-level vision systems are necessary for a machine to accurately acquire, process, and analyze data from the real world. Computer vision and machine learning methods allow a machine to receive input and generate output based on the input. Some machine learning techniques utilize deep artificial neural networks having one or more hidden layers for performing a series of calculations leading to the output. In many present-day applications, convolutional neural networks are used for processing images as input and generating a form of output or making decisions based on the output.

Artificial neural networks, modeled loosely after the human brain, learn mapping functions from inputs to outputs and are designed to recognize patterns. A deep neural network comprises an input layer and an output layer, with one or more hidden layers in between. The layers are made up of nodes, in which computations take place. Various training methods are used to train an artificial neural network during which the neural network uses optimization to continually update weights at the various nodes based on failures until a satisfactory model is achieved. Many types of deep neural networks currently exist and are used for a broad variety of applications and industries including computer vision, series forecasting, automated driving, performing medical procedures, aerospace, and many more. One advantage of deep artificial neural networks is their ability to learn by example, rather than needing to be specifically programmed to perform a task, especially when the tasks would require an impossible amount of programming to perform the operations they are used for today.

It is with respect to this general technical environment that aspects of the present technology disclosed herein have been contemplated. Furthermore, although a general environment has been discussed, it should be understood that the examples described herein should not be limited to the general environment identified in the background.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various embodiments of the present technology generally relate to systems and methods for operating a robotic picking system and preventing errors. More specifically, some embodiments relate to a method of performing data collection through test interactions, the method comprising attempting to pick up an object with a robotic device, wherein the robotic has never previously attempted to pick up the object. If the robotic device successfully picks up the object, the robotic device may subject the object to one or more test stimuli while the robotic device is in possession of the object. The robotic picking system may then record the test results indicating a physical reaction of the object to the one or more test stimuli. Alternatively, if the robotic picking device does not successfully pick up the object, the system may record the failed pick results indicating that the robotic device failed to pick up the object.

In some embodiments, the method further includes determining whether a current configuration of the robotic device can support future iterations of picking up the object based on the physical reaction of the object to the one or more test stimuli. The physical reaction may comprise at least one of the objects dropping from the robotic device, the object slipping while in the possession of the robotic device, the object exerting forces on the robotic device that are above a threshold, or the object not moving relative to the robotic device. The method may further include performing a visual analysis of an object, wherein the visual analysis comprises collecting data related to one or more physical properties of the object. If the robotic device does not drop the object while subjecting the object to the one or more test stimuli, the method may comprise placing the object down. The test stimuli, in some embodiments, includes shaking the object. Subjecting the object to one or more test stimuli may be performed directly above a location from which the object was picked up. Furthermore, if the robotic device drops the object while subjecting the object to one or more test stimuli, the object may fall back to a location from which it was picked up and that object is not damaged when it falls back to the location from which it was picked up.

In an alternative embodiment, a system comprises a robotic picking mechanism, one or more computer-readable storage media, a processing system operatively coupled to the one or more computer-readable storage media, and program instructions, stored on the one or more computer-readable storage media. The program instructions, when read and executed by the processing system, direct the processing system to direct the robotic picking mechanism to attempt to pick up an object, wherein the robotic picking mechanism has never previously attempted to pick up the object. If the robotic picking mechanism successfully picks up the object, the program instructions direct the robotic picking mechanism to subject the object to one or more test stimuli while the robotic picking mechanism is in possession of the object and record test results indicating a physical reaction of the object to the one or more test stimuli. If the robotic picking mechanism does not successfully pick up the object, the program instructions direct the processing system to record failed pick results indicating that the robotic picking mechanism failed to pick up the object.

In yet another embodiment, one or more computer-readable storage media have program instructions stored thereon for controlling a robotic device. The program instructions, when read and executed by a processing system, direct the processing system to at least attempt, via the robotic device, to pick up an object, wherein the robotic device has never previously attempted to pick up the object. The program instructions further direct the processing system to, if the robotic device successfully picks up the object, subject the object, via the robotic device, to one or more test stimuli while the robotic device is in possession of the object and record test results indicating a physical reaction of the object to the one or more test stimuli. If the robotic device does not successfully pick up the object, the program instructions direct the processing system to record failed pick results indicating that the robotic device failed to pick up the object.

BRIEF DESCRIPTION OF THE DRAWINGS

Many aspects of the disclosure can be better understood with reference to the following drawings. The components in the drawings are not necessarily drawn to scale. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

The drawings have not necessarily been drawn to scale. Similarly, some components or operations may not be separated into different blocks or combined into a single block for the purposes of discussion of some of the embodiments of the present technology. Moreover, while the technology is amendable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Various embodiments of the technology described herein generally relate to robotic systems for interacting with objects in a warehouse environment. More specifically, certain embodiments relate to systems and methods for collecting data related to robotic picking of objects through test interactions. In some embodiments, a robotic device may work in collaboration with a computer vision system for collecting data related to new objects in a warehouse, commercial environment, industrial environment, or similar environment.

Robotic devices are often used in warehouse environments to perform laborious or repetitive tasks. In some examples, robotic devices are used for picking items and moving them to another location for various purposes such as order fulfilment, shipping, organization, sorting, and similar tasks. However, a robotic device is often limited in its ability to successfully pick up or move objects due to the nature of the objects and limitations of the robotic device. Furthermore, a picking instrument used by a robotic device may include inherent limitations. For example, if a robotic picking device includes a robotic arm with a suction-based picking instrument on the end, there may be certain materials that the device would never be able to pick up because of the inability to create an air seal, such as a mesh bag, for example. Similarly, there may be a weight limitation for a robotic suction mechanism, wherein the suction power is only strong enough to pick up items below a certain weight. The ability for a robotic device to pick an item may further depend on other physical properties of an object, such as inconsistent shapes that make it difficult to create an air seal, properties of the device itself, or other considerations such as bulk-boxes filled with multiple individual items, materials, and similar.

When a robotic device is set up in a warehouse for picking objects, there is inherently some subset of objects that the robot may never be able to pick up and/or a subset of objects that the robot should never attempt to pick up. One challenging aspect of setting up a warehouse for robotic picking is ensuring that a robotic device is only provided with objects it can successfully pick up or that the robotic device knows which objects to avoid picking up. Attempting but failing to pick up or move objects can have very negative consequences and lead to a variety of issues. For example, if a robotic device attempts to pick up an item that is too heavy and later drops the item, it could damage the dropped item or other equipment in the warehouse that the item is dropped on. Similarly, items may be dropped in problematic locations where they may get stuck, jam warehouse equipment, cause warehouse downtime, or similar issues. If items are provided in bulk-boxes that the robotic device cannot open to access individual items, the robotic device may pick up too many items or incorrectly fulfill orders.

While some objects may be obviously impossible for a robotic device to pick up, such as objects that are far beyond the weight limit or made of certain materials, there are also items for which it may be unclear whether or not the robotic device could successfully pick and move it—and sorting between which objects with which the robot is sure to succeed, sure to fail, or objects that are questionable, can be a difficult task. Warehouses often have stock photos and data related to objects, but the data may be misleading when compared to what the item would actually look like or be packaged like when the robot is interacting with it. Similarly, items and their packaging may change over time, causing unpredictable results based on inventory data or the like.

Thus, embodiments herein are directed to a low-risk method for collecting data about objects through trial interactions in which a robotic device may interact with new objects in such a way that it will not cause damage or downtime. A robotic device may, in some embodiments, have a separate mode in which it may collect data about objects without exposing the objects or warehouse environment to a high risk of dropping or damage. Robotic devices in accordance with the present technology may intentionally perform experiments with test objects, wherein the experiments are designed such that there is a very low change of negative consequences. During the experiments, the robotic device collects data about the object it is picking, allowing the system to keep track of packaging or similar properties that are useful for guiding whether or not the robotic device can be used to interact with the object in the future. The data may be used to guide future picks, may be provided to a machine learning model for operating the robotic device, or may be used to train one or more machine learning models, as just a few examples.

New objects, as referred to herein, may refer to a more general new type of object, rather than each individual object. For example, if a warehouse begins to stock a new product, a single unit of that product may be sent to the robotic device during a test interaction period during which the robotic device may experiment with the object to learn how to handle each instance of the product in the future. Similarly, if a product that already existed in the warehouse changes packaging, shape, size, weight, or similar property, the new version of the product may be sent to the robotic device during a test interaction period so that the robotic device can interact with the object and discover and changes in its ability to pick up and move the object. Products may have inconsistent packaging or appearances for various reasons including different suppliers, and therefore regularly performing test interactions as products change may prevent downtime during regular operation.

Additionally, the test interactions discussed herein may be used to track improvement of the robotic device over time. For example, as a robotic device is updated and improved over time, or as a machine learning model guiding the robotic device improves, the ability of the robotic device to pick up an object may improve. If the robotic device used to pick up and successfully move an object 80% of the time but improves such that it can now pick up and successfully move the object 99% of the time, a subsequent test interaction may discover that change. The product may then be moved to a whitelist comprising items which the robotic device may pick up outside of the trial session, in an example.

The method of using test interactions between a robotic device and various objects is useful in and can be applied in a large variety of scenarios. In the present disclosure, many examples will be provided in the field of robotic picking in warehouse or industrial environments. However, robotic test interactions may be applicable to a wide variety of fields and applications and should not be limited to the specific environments discussed herein.

Figure 1:
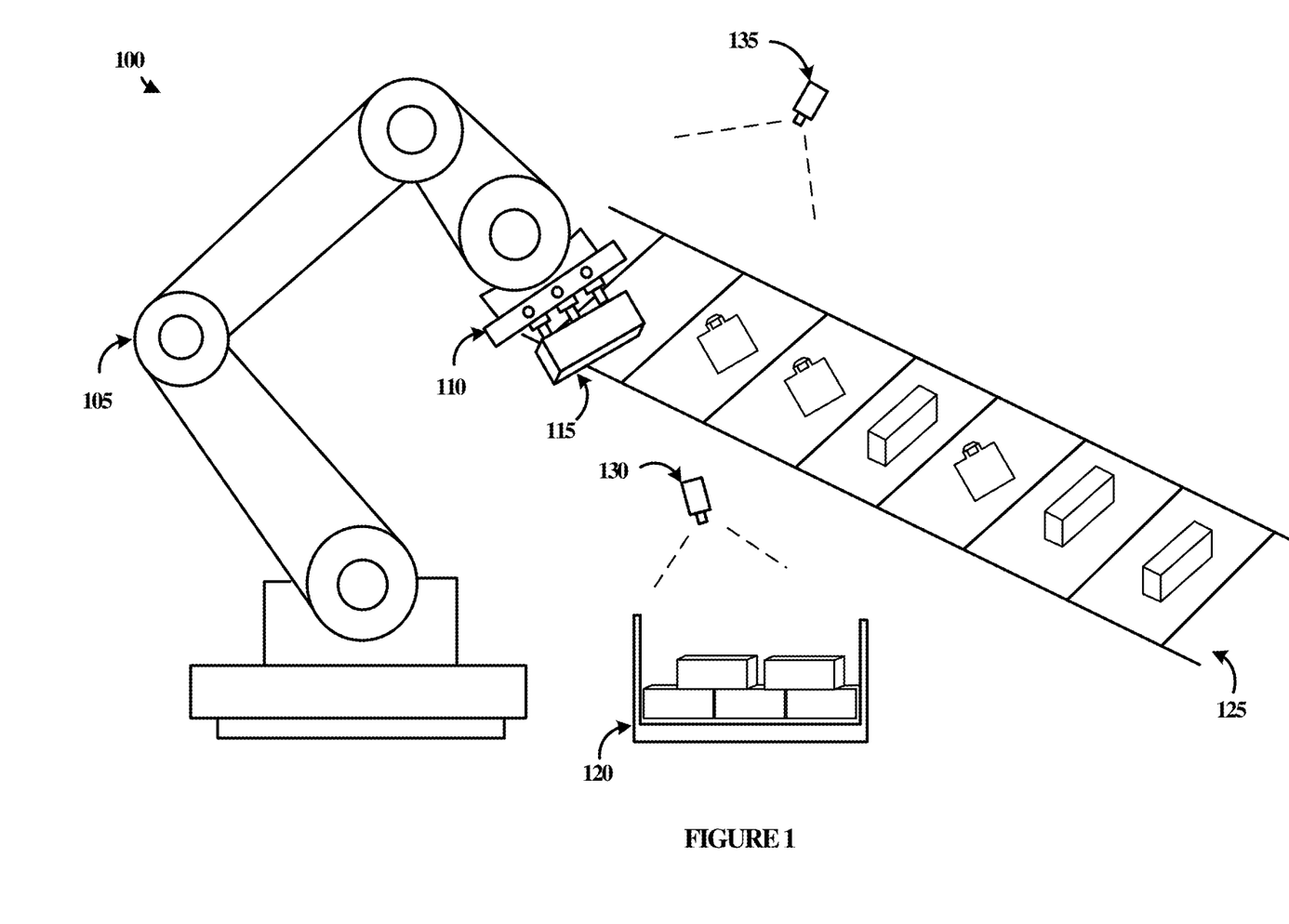
FIG. 1 illustrates a robotic picking environment in accordance with some embodiments of the present technology.

FIG. 1 illustrates an example of warehouse environment 100 having robotic arm 105 for picking items from a bin in accordance with some embodiments of the present technology. FIG. 1 includes robotic arm 105, bin 120, conveyor belt 125, camera 130, and camera 135. Robotic arm comprises picking element 110. Picking element 110 comprises a set of suction-based picking mechanisms, however different numbers and types of picking mechanisms may be utilized in accordance with the present embodiment. Bin 120 is holding boxes that may be found in a warehouse, commercial setting, industrial setting, or the like. Many other types of items may be in a bin or similar container for picking in accordance with the present embodiment. In the present example, robotic arm 105 is a six-degree-of-freedom (6DOF) robotic arm. Picking element 110 is designed for picking items out of bin 120 and placing them onto compartments of conveyor belt 125.

An autonomous robot should have a means for recognizing the environment around it and processing that information to come up with a way to perform a task. Thus, if a robot is picking items out of a bin, it should be able to sense the location and position of a specific item and apply that to determine how to pick up the item and move it to a desired location. A robot capable of sensing and applying that knowledge, even within highly repetitive settings, dramatically decreases the need for human intervention, manipulation, and assistance. Thus, human presence may no longer be required when items are not perfectly stacked or when a robot gets stuck, as a few examples. If a robot regularly gets stuck, it may defeat the purpose of having a robot altogether, because humans may be required to frequently assist the robot.

In some examples, robotic arm 105 and picking element 110 may pick boxes from bin 120 one at a time according to orders received and place the items on the conveyor belt for packaging or place them into packages for shipment. Furthermore, robotic arm 105 and picking element 110 may be responsible for picking items from various locations in addition to bin 120. For example, several bins comprising different merchandise may be located in proximity to robotic arm 105, and robotic arm 105 may fulfill requests for the different pieces of merchandise by picking the correct type of merchandise and placing it onto conveyor belt 125.

Picking element 110 may comprise one or more picking mechanisms for grabbing items in a bin. Picking mechanisms may include one or more suction mechanisms, gripping mechanisms, robotic hands, pinching mechanisms, magnets, or any other picking mechanisms that could be used in accordance with the present disclosure. In some examples, picking element 110 may be additionally used for perturbation, such as poking, touching, stirring, or otherwise moving any items in bin 120, as just a few examples. A deep neural network (DNN) may be trained to guide item pick-up and determine which items have the greatest probabilities of pick-up success. In other embodiments, picking may be guided by a program that does not use a DNN for decision making.

A computer vision system in accordance with embodiments herein may comprise any number of visual instruments, such as cameras or scanners, in order to guide motion, visual analysis, picking, and test interactions. A computer vision system may receive visual information and provide it to a computing system for analysis. Based on the visual information provided by the computer vision system, the system can guide motions and actions taken by robotic arm 105. A computer vision system may provide information that can be used to decipher geometries, material properties, packaging, distinct items (segmentation), bin boundaries, and other visual information related to picking items. Based on this information, the system may decide which item to attempt to pick up and can then use the computer vision system to guide robotic arm 105 during before, during, and after pickup. A computer vision system may also be used to determine that items in a bin should be perturbed in order to provide a higher probability of picking success. A computer vision system may be in a variety of locations allowing it to properly view bin 120, either coupled to or separate from robotic arm 105. In some examples, a computer vision system may be mounted to a component of robotic arm 105 from which it can view bin 120 or may be separate from the robotic device.

In the present example, camera 130 images the contents of bin 120 and camera 135 images a region of conveyor belt 125. Each of camera 130 and camera 135 may comprise one or more cameras. In some examples, a camera in accordance with the present example such as camera 130 comprises an array of cameras for imaging a scene such as in bin 120. Camera 130 and camera 135 are part of a computer vision system associated with robotic arm 105 such as a computer vision system in accordance with the technology disclosed herein.

In the example of FIG. 1, robotic arm 105 has successfully picked box 115 from bin 120 and is in the process of moving box 115 to conveyor belt 125. The computer vision system including camera 130 may have helped guide robotic arm 105 when picking box 115. In some examples, before picking box 115, robotic arm 105 may have previously conducted one or more test interactions with box 115 or a similar box according to methods disclosed herein and identified box 115 as being able to pick up.

Figure 2:
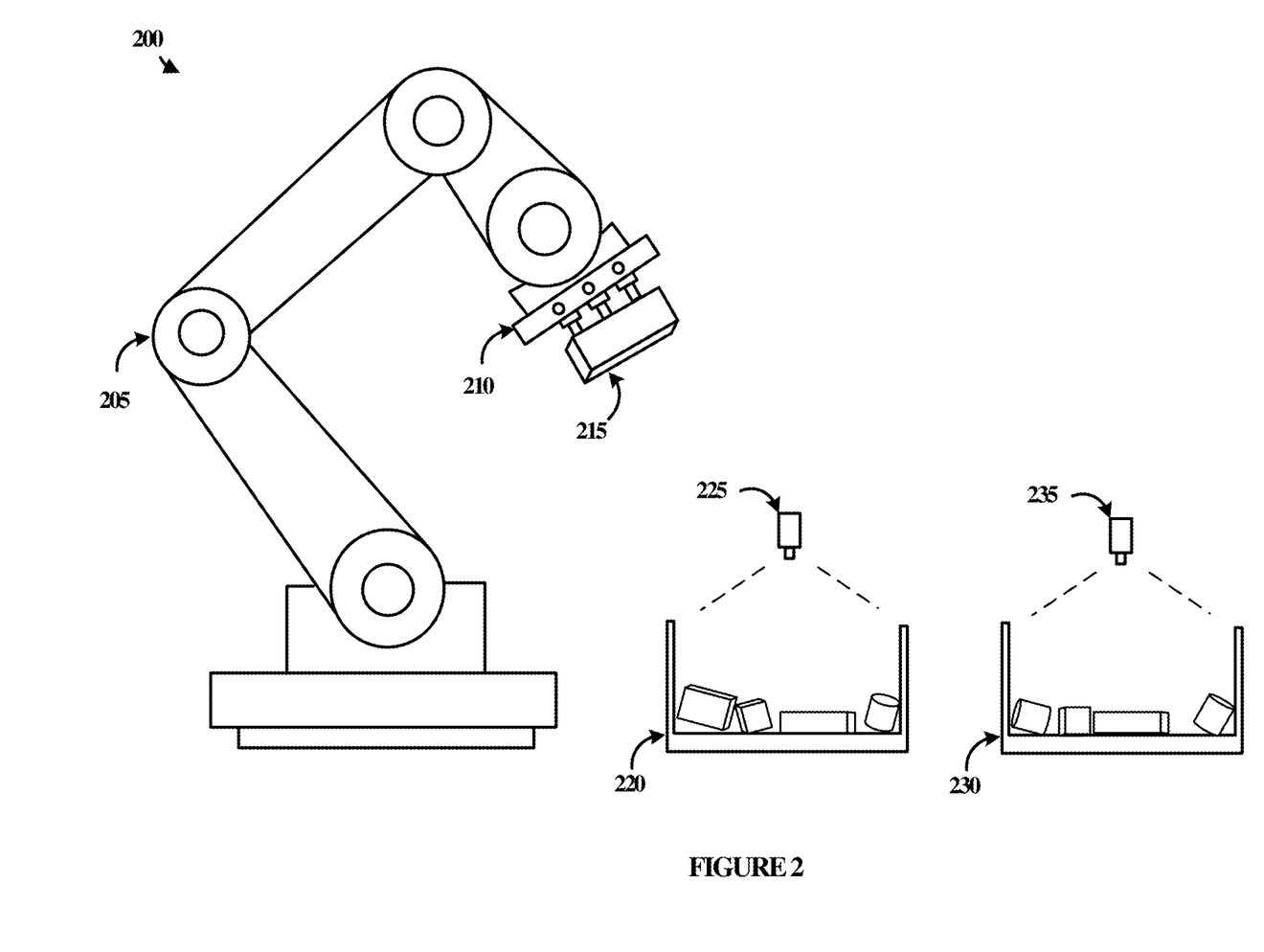
FIG. 2 illustrates a robotic picking environment in accordance with some embodiments of the present technology.

FIG. 2 illustrates another example of a robotic picking environment during regular operation. Robotic picking environment 200 includes robotic arm 205, picking element 210, box 215, bin 220, camera 225, bin 230, and camera 235. Alternatively, to the previous example, a robotic device is moving objects from one bin to another, rather than from one bin to a conveyor belt. In the present example, robotic arm 205 has successfully picked box 215 and is in the process of moving box 215 from bin 220 to bin 230. Similar to the example of FIG. 1, the steps perform in FIG. 2 are in the context of regular operation. Robotic arm 205 has successfully picked up box 215 based on one or more previous trial interactions. The system of FIG. 2 may have identified box 215 from a whitelist comprising a list of objects that robotic arm 205 may attempt to pick up during regular operation.

The examples of FIGS. 1 and 2 are provided as context for FIGS. 3-7. The steps performed by robotic arm 105 and robotic arm 205 may be conducted during regular operation, while the following descriptions apply to a process of testing objects outside of regular operation, but for purposes of avoiding issues or downtime during regular operation.

Figure 3:
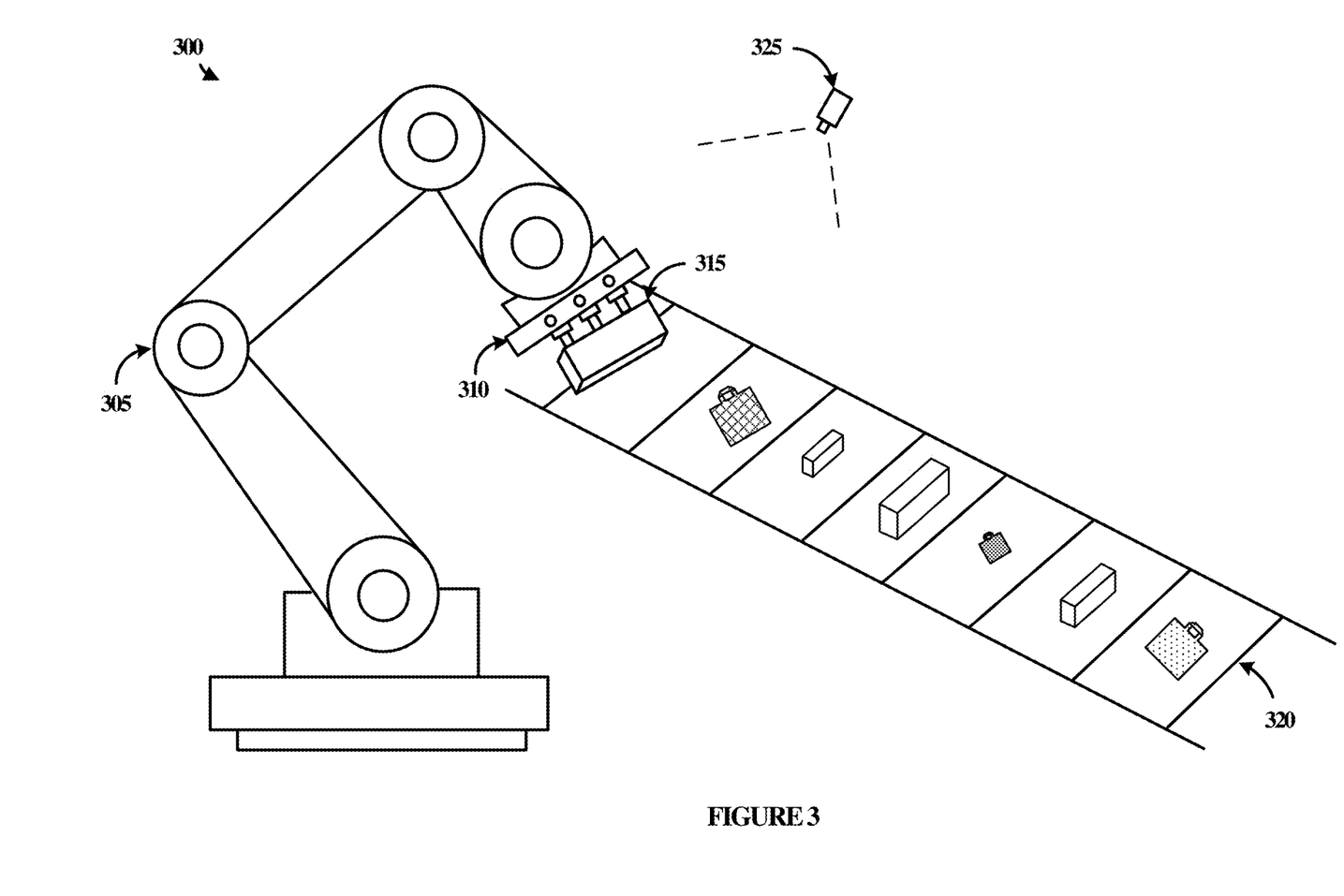
FIG. 3 illustrates a robotic device performing a test interaction in accordance with some embodiments of the present technology.

FIG. 3 illustrates warehouse environment 300 in which robotic arm 305 is operating in a test mode. Objects on conveyor belt 320 are being sent to robotic arm 305 for purposes of test interactions, and are not present for purposes of shipping, order fulfilment, organization, or similar functions. Warehouse environment 300 comprises robotic arm 305, picking element 310, box 315, conveyor belt 320, and camera 325. In the present example, robotic arm 305 has picked box 315 for purposes of exposing it to one or more test stimuli. The test stimuli, in the present example, correlate to real world errors or issues that may arise during regular operation (e.g., lighting conditions, shaking, etc.).

Robotic arm 305 is operating in a test mode in the example of FIG. 3. The items on conveyor belt 320 are being sent to robotic arm 305 for test interactions. In some examples, robotic arm 305 or an associated system may have requested that the objects be sent based on new items or changes to existing items associated with the warehouse. The objects on conveyor belt 320 are not associated with an order during the test mode. When an object arrives, robotic arm may initiate a series of steps for analyzing the object. In some examples, camera 325 is first used to perform a visual analysis of an object before the robotic device attempts to pick up the object. The visual analysis may include collection of data related to size, dimensions, materials, color, packaging, or similar properties of the object. In some scenarios, during the visual analysis, the robotic device may determine that it should not attempt to pick up the object and the device does not perform a physical test interaction. However, in other scenarios, the robotic device may attempt to pick up the item after the visual analysis.

During a test mode, the robotic arm may pick up an object sent for purposes of a test interactions. The robotic arm may attempt to pick up the object and, if it is successful, it may initiate a sequence of test interactions or stimuli. Test interactions may include testing whether or not a good seal is formed between picking element 310 and the object by shaking the object, exposing the object to rapid accelerations or jerky movements, or the like. Test stimuli may include exposing an object to a specific lighting scenario that may be used in operation. Testing may also include a cross reference of inventory or shipping data. Measured values and properties may be compared against nominal information from a database such as a comparison of actual package dimensions and nominal package dimensions in a warehouse database. The testing may further include detecting packaging of items as it changes over time or depending on which supplier provided the item.

While testing box 315, robotic arm 305 holds box 315 directly over the spot from which it was picked. In this way, if robotic arm 305 drops box 315 during any test interactions or attempting picking, box 315 may return (i.e., fall) to conveyor belt with low risk of damaging box 315 or any equipment in warehouse environment 300. By testing objects introduced to the warehouse that robotic arm 305 may interact with during regular operation in the manner described here, the chances of having to stop operation of the robotic device during operating hours or damaging inventory or warehouse equipment is greatly reduced.

Figure 4:
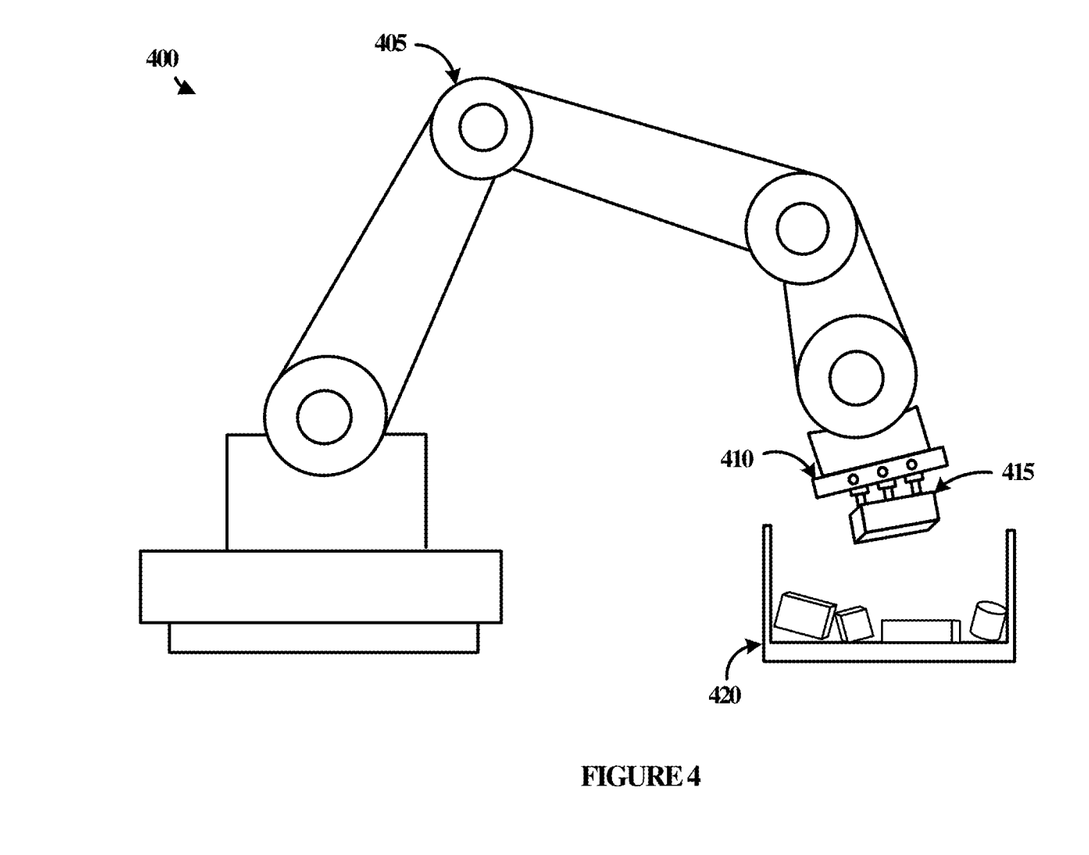
FIG. 4 illustrates a robotic device performing a test interaction in accordance with some embodiments of the present technology in accordance with some embodiments of the present technology.

FIG. 4 shows another example of a testing and data collection session in accordance with the present technology. Warehouse environment 400 includes robotic arm 405, suction element 410, object 415, and bin 420. In the present scene, robotic arm 405 has successfully picked object 415 from bin 420 for purposes of conducting test interactions with object 415 and introducing object 415 to test stimuli during a data collection session outside of regular operation. The contents of bin 420, in the present example, are provided to robotic arm 405 for purposes of test interactions and data collection.

As previously discussed, robotic arm and suction element 410 may test the strength of the seal between suction element 410 and object 415 via one or more types of motion that may include shaking, rapid acceleration or decelerations, jerky movements, or similar motions. Object 415 may also be exposed to various stimuli before, during, or after the test pick including but not limited to exposure to warehouse lighting during operation. The test interactions may also be used for comparing measured and nominal properties and detecting packaging, as just a couple of examples.

The test interactions performed by robotic arm 405 are conducted directly above bin 420 in the present example. In this manner, if the seal is lost between suction element 410 and object 415 during the testing and data collection, object 415 may fall back in to bin 420 a relatively small distance, with a low risk of damaging object 415, damaging the contents of bin 420, damaging warehouse equipment, or causing downtime.

Figure 5:
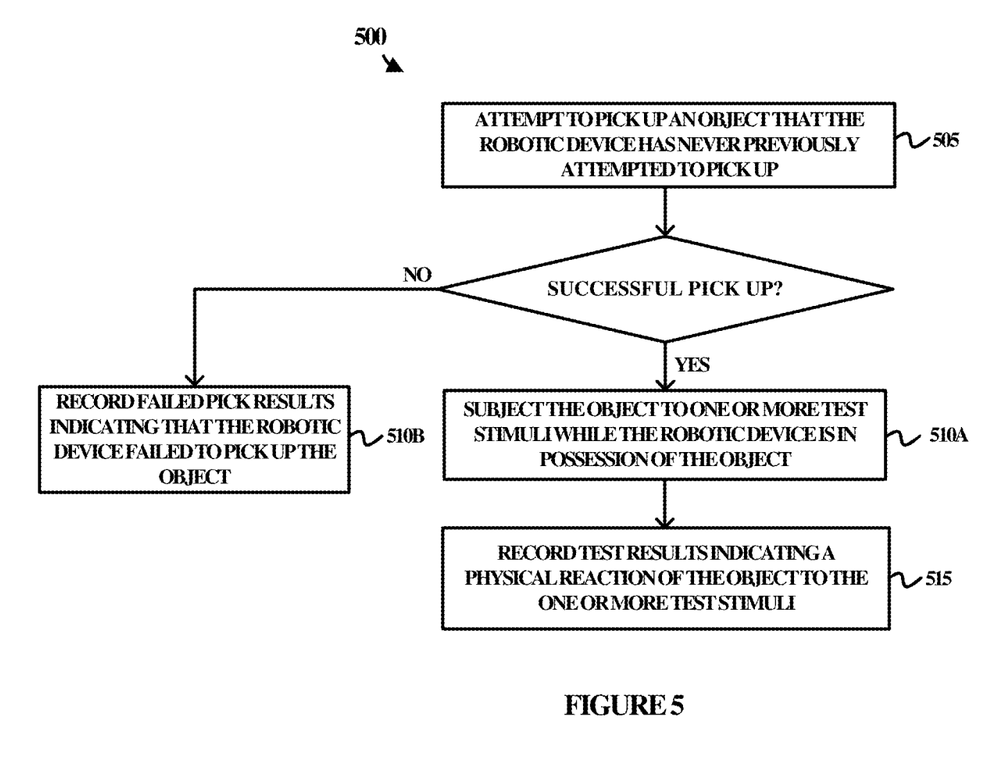
FIG. 5 is a flow chart illustrating a series of steps for collecting data through test interactions in accordance with some embodiments of the present technology.

FIG. 5 is a flow chart illustrating a series of steps that may be performed by a robotic picking system during testing and data collection process 500 in accordance with some embodiments of the present technology. In step 505, a robotic picking device attempts to pick up an object that the robotic device has never previously attempted to pick up. The object may represent a set of objects that are identical to the object being tested. For example, when a warehouse receives a new product, it may receive many instances of the new product, but may use only one of those instances for purposes of conducting test interactions and collecting data for the new product. If the robotic picking system successfully picks up the object, it proceeds to step 510A, in which the system subjects the object to one or more test stimuli while the robotic device is in possession of the object.

Test stimuli may include testing whether or not a good seal is formed between a suction element of the robotic device and the object by shaking the object, exposing the object to rapid accelerations or jerky movements, or the like. Test stimuli may include exposing an object to a specific lighting scenario that may be used in operation. Testing may also include a cross reference of inventory or shipping data. Measured values and properties may be compared against nominal information from a database such as a comparison of actual package dimensions and nominal package dimensions in a warehouse database. The testing may further include detecting packaging of items as it changes over time or depending on which supplier provided the item. Although the tests of the present example are performed while the robotic device is in possession of the object (i.e., while the object is being held/picked), in other examples all or a subset of the data collection may occur while the object is not in the possession of a robotic device.

In step 515, the robotic picking device records the test results indicating a physical reaction of the object to the one or more test stimuli. A physical reaction may include dropping the object, a shifting of position during subjection to stimuli, slipping during subjection to stimuli, unusual forces on the object or the picking device during subjection to stimuli, or any other factor that may provide a low confidence that the picking device will successfully pick and move the object during normal operation. Recording results may be performed in a variety of manners such as adding the object to a blacklist, identifying the object to avoid future pickup, removing the object from a whitelist, updating inventory data, or the like. Results may be used to inform one or more machine learning systems associated with the robotic device in some examples. Results may further be used to train one or more machine learning systems associated with the robotic device in some examples. In some examples, the machine learning techniques utilize of one or more different types of artificial neural networks for operating a robotic device in accordance with the processes discussed in the present disclosure. Similarly, if the robotic device fails to pick up the object, the system records the failed pick results indicating that the robotic device failed to pick up the object. The results of the failed pick may be used in a similar manner as the results of the successful pick and test interactions. Process 500 may further include determining if a current configuration of the robotic device may attempt to pick up iterations of the object during normal operation.

Figure 6:
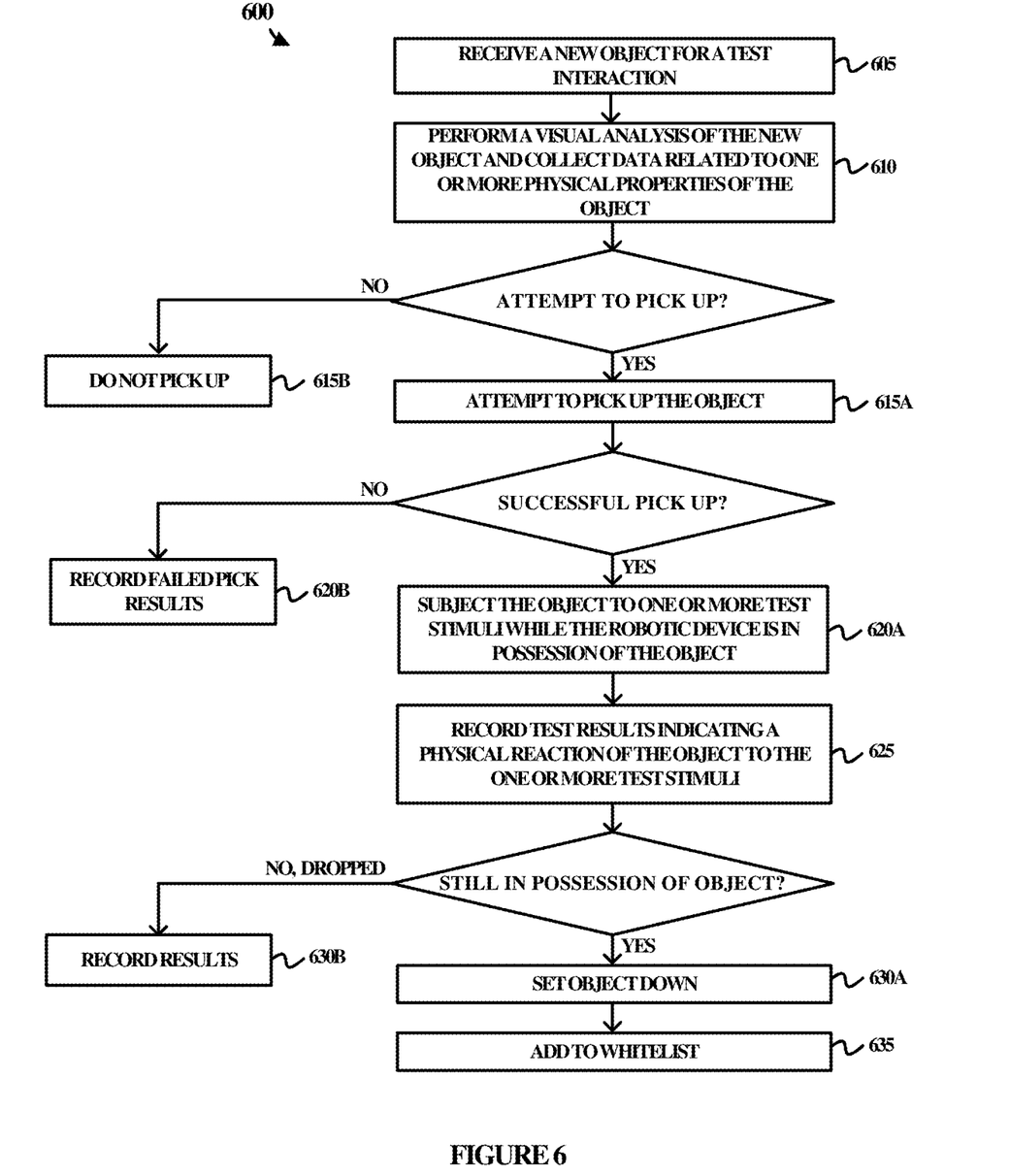
FIG. 6 is a flow chart illustrating a series of steps for collecting data through test interactions in accordance with some embodiments of the present technology.

FIG. 6 is a flow chart illustrating test interaction and data collection process 600 for creating a whitelist for robotic picking in accordance with embodiments of the present technology. In step 605, a robotic picking device receives a new object for a test interaction. In step 610, the system performs a visual analysis of the new object and collects data related to one or more physical properties of the object. In some examples, visual data is collected via a computer vision system associated with the robotic picking device. Visual data may include appearance when exposed to a specific lighting scenario that may be used in operation, cross references of inventory or shipping data with measure values, comparisons of measured values and properties to nominal information from a database such as a comparison of actual package dimensions and nominal package dimensions in a warehouse database, as just a few examples. The testing may further include detecting packaging of items as it changes over time or depending on which supplier provided the item.

If, based on the visual analysis, the system determines that the robotic picking device should attempt to pick up the object during the testing session, the robotic picking device attempts to pick up the object in step 615A. If, based on the visual analysis, the system determines that the robotic picking device should not attempt to pick up the object, the robotic picking device does not pick up the object in step 615B and may continue to the next object, in some scenarios.

If the robotic picking devices successfully picks up the object, it may proceed to subjecting the object to one or more test stimuli while the robotic device is in possession of the object in step 620A. Test stimuli may include testing whether or not a good seal is formed between a suction element and the object by shaking the object, exposing the object to rapid accelerations or jerky movements, or the like. If the robotic picking device does not successfully pick up the object, it may record the failed pick results in step 620B. After subjecting the object to test stimuli in step 620A, the system records the test results, wherein the recordation may include information about whether or not the robotic picking device dropped the object during subjection to the one or more test stimuli. Alternatively, the system may not drop the object, but nonetheless records that the picking device should not attempt to pick up the object during normal operation for a variety of reasons that may include, shifting of position during subjection to stimuli, slipping during subjection to stimuli, unusual forces on the object or the picking device during subjection to stimuli, or any other factor that may provide a low confidence that the picking device will successfully pick and move the object during normal operation.

If, after recording the results of the test interactions, the object is still in the possession of the robotic picking device, the robotic picking device may set the object back down to the location it was picked from or near the location it was picked from in step 630A. After the object is set down, in step 630A, the object is added to a whitelist, wherein the whitelist includes objects that the robotic picking device may attempt to pick up during regular operation. If the object is no longer in the possession of the robotic picking device, it was dropped and the system records the results in 630B, wherein recording the results may including adding the object to a blacklist or removing the object from a whitelist. Finally, in step 635, the robotic system may add the object to a whitelist if it determines that the robotic device may attempt to pick up the object during normal operation.

The technology described herein should not be limited to only robotic picking applications. The present technology has many applications in which a means for test interactions related to stocking warehouses or similar industrial environments is useful.

The processes described herein may be implemented in several different variations of media including software, hardware, firmware, and variations or combinations thereof. For example, methods of collecting data through test interactions described herein may be implemented in software, while a computing vision system or robotic picking device may be implemented entirely in hardware or a combination. Similarly, embodiments of the technology may be implemented with a trained neural net entirely in software on an external computing system or may be implemented as a combination of the two across one or more devices. The systems and methods for collecting data through test interactions herein may be implemented on various types of components including entirely software-based implementations, entirely hardware-based aspects, such as trained computer vision systems, or variations and combinations thereof.

Figure 7:
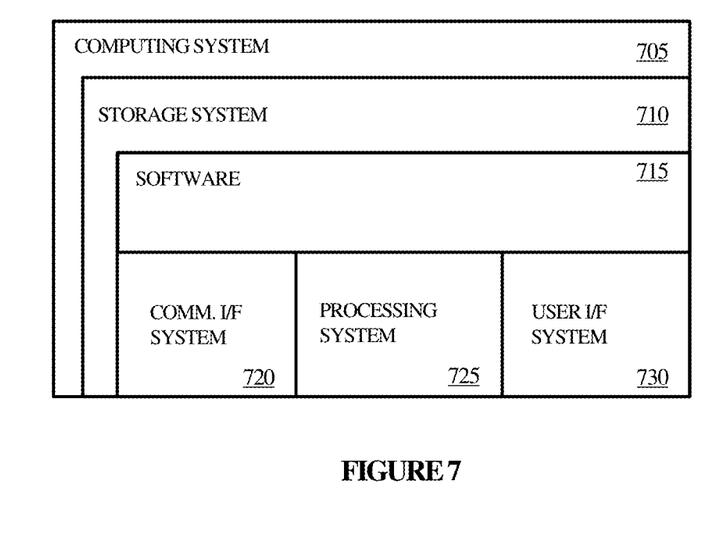
FIG. 7 is an example of a computing system in which some embodiments of the present technology may be utilized.

FIG. 7 illustrates computing system 705 that is representative of any system or collection of systems in which the various processes, programs, services, and scenarios disclosed herein may be implemented. Examples of computing system 705 include, but are not limited to, desktop computers, laptop computers, server computers, routers, web servers, cloud computing platforms, and data center equipment, as well as any other type of physical or virtual server machine, physical or virtual router, container, and any variation or combination thereof.

Computing system 705 may be implemented as a single apparatus, system, or device or may be implemented in a distributed manner as multiple apparatuses, systems, or devices. Computing system 705 may include, but is not limited to, storage system 710, software 715, communication interface system 720, processing system 725, and user interface system 730. Components of computing system 705 may be optional or excluded in certain implementations. Processing system 725 is operatively coupled with storage system 710, communication interface system 720, and user interface system 730, in the present example.

Processing system 725 loads and executes software 715 from storage system 710. Software 715 includes and implements various data collection processes described herein, which is representative of the methods discussed with respect to the preceding Figures. When executed by processing system 725, software 715 directs processing system 725 to operate for purposes of data collection as described herein for at least the various processes, operational scenarios, and sequences discussed in the foregoing implementations. Computing system 705 may optionally include additional devices, features, or functionality not discussed for purposes of brevity.

Referring still to FIG. 7, processing system 725 may comprise a micro-processor and other circuitry that retrieves and executes software 715 from storage system 710. Processing system 725 may be implemented within a single processing device but may also be distributed across multiple processing devices or sub-systems that cooperate in executing program instructions. Examples of processing system 725 include general purpose central processing units, graphical processing units, application specific processors, and logic devices, as well as any other type of processing device, combinations, or variations thereof.

Storage system 710 may comprise any computer readable storage media readable by processing system 725 and capable of storing software 715. Storage system 710 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 710 may also include computer readable communication media over which at least some of software 715 may be communicated internally or externally. Storage system 710 may be implemented as a single storage device but may also be implemented across multiple storage devices or sub-systems co-located or distributed relative to each other. Storage system 710 may comprise additional elements, such as a controller, capable of communicating with processing system 725 or possibly other systems.

Software 715 may be implemented in program instructions and among other functions may, when executed by processing system 725, direct processing system 725 to operate as described with respect to the various operational scenarios, sequences, and processes illustrated herein. For example, software 715 may include program instructions for implementing data collection processes, test interaction processes, computer vision processes, neural networks, decision making processes, or any other reasoning or operational processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multithreaded, or in accordance with any other suitable execution paradigm, variation, or combination thereof. Software 715 may include additional processes, programs, or components, such as operating system software, modeling, robotic control software, computer vision software, virtualization software, or other application software. Software 715 may also comprise firmware or some other form of machine-readable processing instructions executable by processing system 725.

In general, software 715 may, when loaded into processing system 725 and executed, transform a suitable apparatus, system, or device (of which computing system 705 is representative) overall from a general-purpose computing system into a special-purpose computing system customized for one or more of the various operations or processes described herein. Indeed, encoding software 715 on storage system 710 may transform the physical structure of storage system 710. The specific transformation of the physical structure may depend on various factors in different implementations of this description. Examples of such factors may include, but are not limited to, the technology used to implement the storage media of storage system 710 and whether the computer-storage media are characterized as primary or secondary storage, as well as other factors.

For example, if the computer readable storage media are implemented as semiconductor-based memory, software 715 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 720 may include communication connections and devices that allow for communication with other computing systems (not shown) over communication networks or connections (not shown). Examples of connections and devices that together allow for inter-system communication may include network interface cards, antennas, power amplifiers, radio-frequency circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 705 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further, any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of performing data collection through test interactions, the method comprising:
    attempting, while in a test mode, to pick up an object with a robotic device, wherein the object is representative of other instances of the object and the robotic device has never previously attempted to pick up any instances of the object;
    if the robotic device successfully picks up the object in the test mode:
        subjecting the object to one or more test stimuli while the robotic device is in possession of the object;
        recording test results indicating a physical reaction of the object to the one or more test stimuli and a level of confidence associated with the successful picking up of the object based on the physical reaction; and
        adding the object to a whitelist indicating that the robotic device may attempt to pick up the other instances of the object during normal operation; and
    if the robotic device does not successfully pick up the object in the test mode:
        recording failed pick results indicating that the robotic device failed to pick up the object; and
        adding the object to a blacklist indicating that the robotic device should not attempt to pick up the other instances of the object during the normal operation.

2. The method of claim 1, further comprising, before adding the object to the whitelist, determining whether a current configuration of the robotic device can support future iterations of picking up the other instances of the object based at least in part on the test results.

3. The method of claim 2, wherein the physical reaction comprises at least one of: the object dropping from the robotic device, the object slipping while in the possession of the robotic device, the object exerting forces on the robotic device that are above a defined threshold, and the object not moving relative to the robotic device.

4. The method of claim 1, further comprising, before attempting to pick up the object, performing a visual analysis of the object, wherein the visual analysis comprises collecting data related to one or more physical properties of the object and storing the data for the other instances of the object.

5. The method of claim 1, further comprising, if the robotic device successfully picks up the object and does not drop the object while subjecting the object to the one or more test stimuli, placing the object back down where it was picked up from.

6. The method of claim 1, wherein the one or more test stimuli includes shaking the object.

7. The method of claim 6, wherein subjecting the object to the one or more test stimuli is performed directly above a location from which the object was picked up.

8. The method of claim 1, wherein, if the robotic device drops the object while subjecting the object to the one or more test stimuli:
    the object falls back to a location from which the object was picked up; and
    the object is not damaged when the object falls back to the location from which the object was picked up.

9. A system comprising:
    a robotic picking mechanism;
    one or more computer-readable storage media;
    a processing system operatively coupled to the one or more computer-readable storage media; and
    program instructions, stored on the one or more computer-readable storage media, wherein the program instructions, when read and executed by the processing system, direct the processing system to:
        direct the robotic picking mechanism to, in a test mode, attempt to pick up an object, wherein the object is representative of other instances of the object and the robotic picking mechanism has never previously attempted to pick up any instances of the object;
        if the robotic picking mechanism successfully picks up the object in the test mode:
            direct the robotic picking mechanism to subject the object to one or more test stimuli while the robotic picking mechanism is in possession of the object;
            record test results indicating a physical reaction of the object to the one or more test stimuli and a level of confidence associated with the successful picking up of the object based on the physical reaction; and
            add the object to a whitelist indicating that the robotic picking mechanism may attempt to pick up the other instances of the object during normal operation; and
        if the robotic picking mechanism does not successfully pick up the object in the test mode:
            record failed pick results indicating that the robotic picking mechanism failed to pick up the object; and
            add the object to a blacklist indicating that the robotic picking mechanism should not attempt to pick the other instances of the object during the normal operation.

10. The system of claim 9, wherein the program instructions, when read and executed by the processing system, further direct the processing system to, before adding the object to the whitelist, determine whether a current configuration of the robotic picking mechanism can support future iterations of picking up the other instances of the object based at least in part on the test results.

11. The system of claim 10, wherein the physical reaction comprises at least one of: the object dropping from the robotic picking mechanism, the object slipping while in the possession of the robotic picking mechanism, the object exerting forces on the robotic picking mechanism that are above a defined threshold, and the object not moving relative to the robotic picking mechanism.

12. The system of claim 9, wherein the program instructions, when read and executed by the processing system, further direct the processing system to, before attempting to pick up the object, perform a visual analysis of the object, wherein the visual analysis comprises collecting data related to one or more physical properties of the object and storing the data for the other instances of the object.

13. The system of claim 9, wherein the program instructions, when read and executed by the processing system, further direct the processing system to, if the robotic picking mechanism successfully picks up the object and does not drop the object while subjecting the object to the one or more test stimuli, direct the robotic picking mechanism to place the object back down where it was picked up from.

14. The system of claim 9, wherein the one or more test stimuli includes shaking the object.

15. The system of claim 14, wherein subjecting the object to the one or more test stimuli is performed directly above a location from which the object was picked up.

16. The system of claim 9, wherein, if the robotic picking mechanism drops the object while subjecting the object to the one or more test stimuli:
- the object falls back to a location from which the object was picked up; and
- the object is not damaged when the object falls back to the location from which the object was picked up.

17. One or more non-transitory computer-readable storage media having program instructions stored thereon for controlling a robotic device, wherein the program instructions, when read and executed by a processing system, direct the processing system to at least:
- attempt, via the robotic device and while the robotic device is in a test mode, to pick up an object, wherein the object is representative of other instances of the object and the robotic device has never previously attempted to pick up any instances of the object;
- if the robotic device successfully picks up the object in the test mode:
  - subject the object, via the robotic device, to one or more test stimuli while the robotic device is in possession of the object;
  - record test results indicating a physical reaction of the object to the one or more test stimuli and a level of confidence associated with the successful picking up of the object based on the physical reaction; and
  - add the object to a whitelist indicating that the robotic device may attempt to pick up the other instances of the object during normal operation; and
- if the robotic device does not successfully pick up the object in the test mode:
  - record failed pick results indicating that the robotic device failed to pick up the object; and
  - add the object to a blacklist indicating that the robotic device should not attempt to pick up the other instances of the object during the normal operation.

18. The one or more non-transitory computer-readable storage media of claim 17, wherein the program instructions, when read and executed by the processing system, further direct the processing system to, before adding the object to the whitelist, determine whether a current configuration of the robotic device can support future iterations of picking up the other instances of the object based at least in part on the test results.

19. The one or more non-transitory computer-readable storage media of claim 18, wherein the physical reaction comprises at least one of: the object dropping from the robotic device, the object slipping while in the possession of the robotic device, the object exerting forces on the robotic device that are above a defined threshold, and the object not moving relative to the robotic device.

20. The one or more non-transitory computer-readable storage media of claim 17, wherein the program instructions, when read and executed by the processing system, further direct the processing system to, before attempting to pick up the object, perform a visual analysis of the object, wherein the visual analysis comprises collecting data related to one or more physical properties of the object and storing the data for the other instances of the object.

* * * * *